United States Patent
Moroz et al.

(10) Patent No.: US 7,824,639 B2
(45) Date of Patent: Nov. 2, 2010

(54) EXHAUST TREATMENT SYSTEM AND CATALYST SYSTEM

(75) Inventors: Boris L'vovich Moroz, Novosibirsk (RU); Karl C. Kharas, Tulsa, OK (US); Mikhail Yurievich Smirnov, Novosibirsk (RU); Alexander Sergeevich Bobrin, Novosibirsk (RU); Valerii Ivanovich Bukhtlyarov, Novosibirsk (RU)

(73) Assignee: Umicore AG & Co. KG, Hanau (DE)

( * ) Notice: Subject to any disclaimer, the term of this patent is extended or adjusted under 35 U.S.C. 154(b) by 0 days.

(21) Appl. No.: 12/144,761

(22) Filed: Jun. 24, 2008

(65) Prior Publication Data

US 2008/0317653 A1 Dec. 25, 2008

Related U.S. Application Data

(63) Continuation of application No. 10/794,789, filed on Mar. 5, 2004, now abandoned.

(51) Int. Cl.
| | |
|---|---|
| *B01D 53/14* | (2006.01) |
| *B01D 53/56* | (2006.01) |
| *B01D 50/00* | (2006.01) |
| *B01D 53/34* | (2006.01) |
| *C01B 31/18* | (2006.01) |
| *B01J 23/40* | (2006.01) |
| *B01J 23/42* | (2006.01) |
| *B01J 23/56* | (2006.01) |
| *B01J 23/44* | (2006.01) |

(52) U.S. Cl. .......... 423/246; 422/168; 502/326; 502/327; 502/332; 502/333; 502/334; 502/344; 502/339

(58) Field of Classification Search ............... 422/177; 423/245.1; 502/330, 344, 326, 327, 332–334, 502/339
See application file for complete search history.

(56) References Cited

U.S. PATENT DOCUMENTS

| | | | |
|---|---|---|---|
| 4,661,468 A * | 4/1987 | Lee et al. ............... | 502/333 |
| 5,474,965 A * | 12/1995 | Nakatsuji et al. ........ | 502/330 |
| 5,783,515 A | 7/1998 | Sakurai et al. | |
| 5,849,255 A | 12/1998 | Sawyer et al. .......... | 423/213.5 |
| 5,897,846 A | 4/1999 | Kharas et al. .......... | 423/213.5 |
| 5,948,377 A * | 9/1999 | Sung .................. | 423/213.5 |
| 6,087,295 A * | 7/2000 | Kharas et al. .......... | 502/300 |
| 6,127,300 A | 10/2000 | Kharas et al. .......... | 502/62 |
| 6,365,118 B1 | 4/2002 | Kharas et al. | |

(Continued)

FOREIGN PATENT DOCUMENTS

EP 0831961 B1 1/2001

(Continued)

OTHER PUBLICATIONS

JPO Machine Translation of JP-08-173768, Sep. 7, 1996.*

(Continued)

*Primary Examiner*—Alexa D Neckel
*Assistant Examiner*—Matthew J Merkling
(74) *Attorney, Agent, or Firm*—Smith, Gambrell & Russell, LLP (57) ABSTRACT

A catalyst system comprises a gold catalyst capable of oxidizing CO; a hydrocarbon oxidation catalyst; and a hydrocarbon adsorbing material.

16 Claims, 6 Drawing Sheets

U.S. PATENT DOCUMENTS

| | | | |
|---|---|---|---|
| 6,528,031 B1 | 3/2003 | Park et al. | |
| 6,911,413 B2 * | 6/2005 | Wu et al. | 502/344 |
| 2001/0051590 A1 * | 12/2001 | Noda et al. | 502/333 |
| 2002/0074174 A1 * | 6/2002 | Dettling et al. | 180/68.1 |
| 2002/0076368 A1 * | 6/2002 | Hemingway et al. | 422/186.04 |
| 2003/0153453 A1 * | 8/2003 | Kasahara et al. | 502/64 |
| 2004/0127353 A1 * | 7/2004 | Wu et al. | 502/344 |
| 2005/0129589 A1 * | 6/2005 | Wei et al. | 422/177 |

FOREIGN PATENT DOCUMENTS

| | | | |
|---|---|---|---|
| JP | 08173768 A | * | 7/1996 |
| WO | 97/00119 | | 1/1997 |
| WO | WO 9851401 A1 | * | 11/1998 |

OTHER PUBLICATIONS

Official translation of JP1996173768A1 (Apr. 2009).*

European Search Report dated Nov. 17, 2006.

Qing Xu, et al., "The Preparation of Highly Dispersed Au/Al2O3 by Aqueous Impregnation", Catalysis Letters, vol. 85, Nos. 3-4, Feb. 2003, pp. 229-235.

Geoffrey C. Bond, et al., "Catalysis by Gold", Catal. Rev.—Sci. Eng., 41(3&4), pp. 319-388 (1999).

* cited by examiner

EXHAUST TREATMENT SYSTEM AND CATALYST SYSTEM

This application is a continuation of U.S. patent application Ser. No. 10/794,789, filed 5 Mar. 2004, now abandoned which is herein incorporated by reference in its entirety.

BACKGROUND

In order to meet exhaust fluid emission standards, the exhaust emitted from internal combustion engines is treated prior to emission into the atmosphere. Exhaust fluids may be routed through at least one exhaust emission treatment device disposed in fluid communication with the exhaust outlet system of the engine, wherein the exhaust fluids are treated by reactions with a catalyst composition deposited on a porous support material. Examples of exhaust emission treatment devices include catalytic converters, catalytic absorbers, diesel particulate traps, non-thermal plasma conversion devices, and the like. The exhaust fluid generally contains undesirable emission components including carbon monoxide (CO), hydrocarbons (HC), and nitrogen oxides ($NO_x$). As a means of simultaneously removing the objectionable CO, HC, and $NO_x$ components, various catalyst compositions have been developed.

However, a need remains in the art for an improved catalytic exhaust treatment device for carbon monoxide oxidation.

SUMMARY

One embodiment of a catalyst system comprises a gold catalyst capable of oxidizing CO; a hydrocarbon oxidation catalyst; and a hydrocarbon adsorbing material.

One embodiment of a method of using a catalyst system comprises passing an exhaust stream over a catalyst system comprising a gold catalyst capable of oxidizing CO, a hydrocarbon oxidation catalyst; and a hydrocarbon adsorbing material; and oxidizing at least a portion of CO present in the exhaust stream.

The above-described and other features will be appreciated and understood by those skilled in the art from the following detailed description, drawings, and appended claims.

BRIEF DESCRIPTION OF THE DRAWINGS

Refer now to the figures, which are exemplary embodiments, and wherein the like elements are numbered alike.

DETAILED DESCRIPTION

Figure 1:
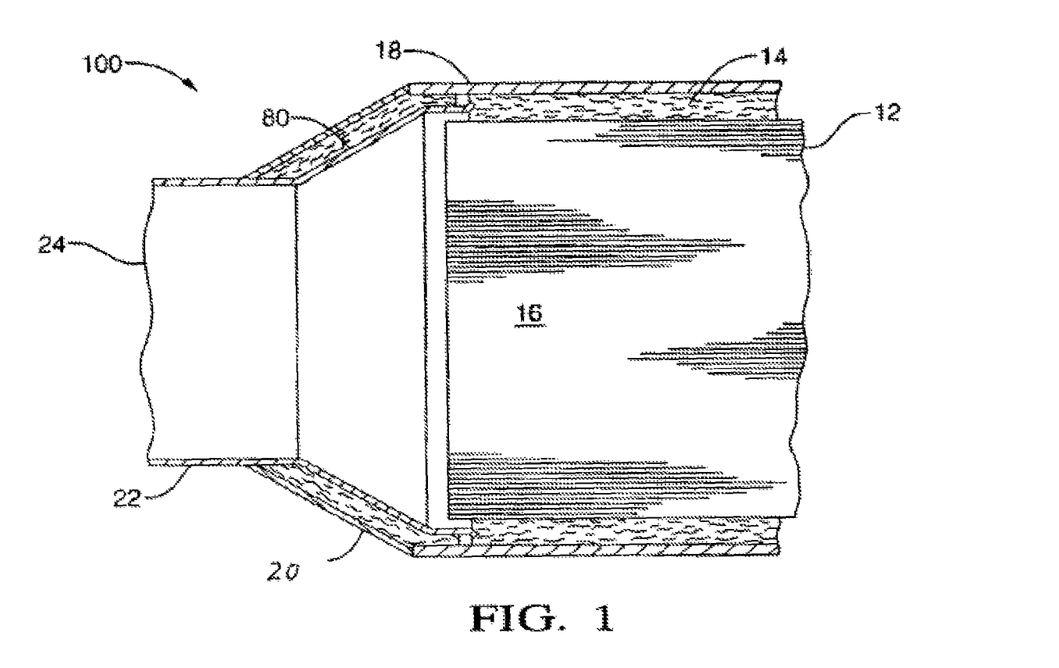
FIG. 1 is a partial cross-sectional view of an exhaust treatment device.

Referring now to FIG. 1, an exemplary embodiment of an exhaust treatment device generally designated 100 is illustrated. The exhaust treatment device 100 may include, but is not limited to, the following examples, catalytic converters, evaporative emissions devices, scrubbing devices (e.g., hydrocarbon, sulfur, and the like), particulate filters/traps, adsorbers/absorbers, non-thermal plasma reactors, and the like, as well as combinations comprising at least one of the foregoing devices. The exhaust treatment device 100 comprises a substrate 12 disposed within a retention material 14 forming a subassembly 16. A shell 18 is disposed around the subassembly 16. An end-cone 20 comprising a snorkel 22 having an opening 24 is in physical communication with shell 18. Opening 24 allows exhaust fluid communication with substrate 12. As will be discussed in much greater detail, a catalyst may be disposed on/throughout substrate 12.

Substrate 12 may comprise any material designed for use in a spark ignition or diesel engine environment and having the following characteristics: (1) capable of operating at temperatures up to about 600° C., and up to about 1,000° C. for some applications, depending upon the location of a device within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or gaseous compounds of sulfur such as $SO_2$, COS, and $H_2S$; and (3) having sufficient surface area and structural integrity to support a catalyst.

Some possible materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials may be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore alumina sponges, and porous ultra-low expansion glasses. Furthermore, these substrates may be coated with oxides and/or hexaaluminates, such as stainless steel foil coated with a hexaaluminate scale.

Although the substrate 12 may have any size or geometry, the size and geometry are preferably chosen to optimize surface area in the given exhaust emission control device design parameters. For example, the substrate 12 may have a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Located between the substrate 12 and the shell 18 may be a retention material 14 that insulates the shell 18 from both the exhaust fluid temperatures and the exothermic catalytic reaction occurring within the catalyst substrate 12. The retention material 14, which enhances the structural integrity of the substrate by applying compressive radial forces about it, reducing its axial movement and retaining it in place, may be concentrically disposed around the substrate to form a retention material/substrate subassembly 16.

The retention material 14, which may be in the form of a mat, particulates, or the like, may be an intumescent material (e.g., a material that comprises vermiculite component, i.e., a component that expands upon the application of heat), a non-intumescent material, or a combination thereof. These materials may comprise ceramic materials (e.g., ceramic fibers) and other materials such as organic and inorganic binders and the like, or combinations comprising at least one of the foregoing materials. Non-intumescent materials include materials such as those sold under the trademarks "NEXTEL" and "INTERAM 1101HT" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The retention material/substrate subassembly 16 may be concentrically disposed within a shell 18. The choice of material for the shell 18 depends upon the type of exhaust fluid, the maximum temperature reached by the substrate 12, the maximum temperature of the exhaust fluid stream, and the like. Suitable materials for the shell 18 may comprise any material that is capable of resisting under-car salt, temperature, and corrosion. For example, ferrous materials may be employed such as ferritic stainless steels. Ferritic stainless steels may include stainless steels such as, e.g., the 400-Series such as SS-409, SS-439, and SS-441, with grade SS-409 generally preferred.

End cone 20 (or alternatively an end cone(s), end plate(s), exhaust manifold cover(s), and the like), which may comprise similar materials as the shell, may be disposed at one or both ends of the shell. The end cone 20 (end plate or the like) is sealed to the shell to prevent leakage at the interface thereof. These components may be formed separately (e.g., molded or the like), or may be formed integrally with the housing using a methods such as, e.g., a spin forming, or the like.

In an alternative method, for example, the shell may comprise two half shell components, also known as clamshells. The two half shell components are compressed together about the retention material/substrate subassembly, such that an annular gap preferably forms between the substrate and the interior surface of each half shell as the retention material becomes compressed about the substrate.

The exhaust emission treatment device 100 may be manufactured by one or more techniques, and, likewise, the retention material/substrate subassembly 16 may be disposed within the shell 18 using one or more methods. For example, the retention material/substrate subassembly 16 may be inserted into a variety of shells 18 using a stuffing cone. The stuffing cone is a device that compresses the retention material 14 concentrically about the substrate 12. The stuffing cone then stuffs the compressed retention material/substrate subassembly 16 into the shell, such that an annular gap preferably forms between the substrate 12 and the interior surface of the shell 18 as the retention material 14 becomes compressed about the substrate 12. Alternatively, if the retention material 14 is in the form of particles (e.g., pellets, spheres, irregular objects, or the like) the substrate 12 may be stuffed into the shell 18 and the retention material may be disposed in the shell 18 between the substrate 12 and the shell 18.

As briefly mentioned above, a catalyst may be disposed on and/or throughout (hereinafter "on") substrate 12. The catalyst may comprise any material capable of carbon monoxide oxidation. For example, the catalyst preferably comprises gold. The gold catalyst may be supported on a support material. Additionally, the gold catalyst is sufficiently dispersed throughout the support material and has a particle size (taken along the major diameter (i.e., the longest diameter)) sufficient to be active for carbon monoxide oxidation at temperatures as low as $-70°$ C. For example, the gold catalyst may have a particle size of less than or equal to about 10 nanometers (nm). With in this range, a particle size of less than or equal to about 7 nm is preferred, with a particle size of less than or equal to about 4 nm more preferred. Preferably, greater than or equal to about 80% of the number of particles have a particle size less than or equal to 10 nm, with greater than or equal to about 90% more preferred. With regard to the dispersion of the gold, the gold catalyst is preferably "highly dispersed", i.e., the gold particles are substantially evenly distributed throughout the metal oxide (i.e., the concentration gradient of gold particles varies less than or equal to about 7 wt % throughout the substrate, based on a total weight of the gold particles disposed on the substrate).

The gold catalyst may be prepared by any number of methods, e.g., impregnation of a support material with a salt of gold catalyst, followed by drying and reduction, and exchange of protons or other cations associated with the support material for cations of the gold catalyst, followed by washing, drying and reduction.

However, the gold catalyst is preferably prepared by 1) coprecipitation of hydroxides or similar precursors to both support material and metal, followed by drying, calcination, and reduction; or 2) precipitation-deposition of gold onto a support material by initial neutralization of chloroauric acid with base, with concurrent partial or total substitution of hydroxide for chloride within the gold coordination sphere, followed by adsorption of the hydroxogold or chlorohydroxogold complexes onto the support material, followed by an effective sequence of washing and calcination steps to yield the catalyst.

One method of making a gold catalyst may comprise mixing a support material (e.g., metal oxide) with an acidified solution comprising a gold compound to form a metal oxide/gold complex; contacting the metal oxide/gold complex with a base to form a metal oxide/gold hydroxide complex; washing the metal oxide/gold hydroxide complex with water; and transforming the metal oxide/gold hydroxide complex to the gold catalyst. The metal oxide/gold hydroxide complex is then treated, e.g., with heat, to transform the metal oxide/gold hydroxide complex to the gold catalyst.

Without being bound by theory, it is believed that washing the metal oxide/gold complex with a strong base results in replacement of some or all of the negatively charged ligand(s) with hydroxide ions with the resultant formation of a metal oxide/gold hydroxide complex. The term "ligand" as used herein includes functionalities such as counterion that are bound primarily through ionic interactions and functionalities whose bonds to gold are more covalent in character. The negatively charged ligand(s), if present, would contribute to the growth of gold particle size when the catalyst is exposed to elevated temperatures whereas the hydroxide ions do not. It is further believed that some or all of the hydroxide ions are removed through calcination.

Useful gold compounds comprise gold in the +3 oxidation and one or more negatively charged ligands. Examples of useful gold compounds include $HAuCl_4$, $NaAuCl_4$, $(AuBr_3)_2$, $AuF_3$, and combinations comprising at least one of the foregoing compounds. Preferably, the gold compound is $HAuCl_4$.

Useful support metal oxides include, but are not limited to, alumina, zirconia, titania, ceria, tin oxide, iron oxide ($Fe_2O_3$), lead oxide, and combinations comprising at least one of the foregoing oxides. It is envisioned that silica and aluminosilicates may also be used. Preferably, the aluminosilicates are derivatized with reagents such as N,N,N-trimethyl-3-(trimethoxysilyl)-1-propanaminium chloride. This reagent will derivatize the surface with a N,N,N-trimethyl-3-silylpropylammonium cation, rendering the surface positively charged and susceptible to adsorbing anionic gold complexes. Preferably, the metal oxide is alumina, e.g., alpha ($\alpha$) alumina, delta ($\delta$) alumina, gamma ($\gamma$) alumina and/or theta ($\theta$) alumina. Useful bases are those capable of replacing the negatively charged ligand(s) with hydroxide ions. Exemplary strong bases include ammonium hydroxide, tetralkylammonium hydroxide, ammonium carbonate, tetraalkylammonium carbonate, sodium hydroxide, potassium hydroxide, cesium hydroxide, rubidium hydroxide, and combinations comprising at least one of the foregoing compounds.

One method of making a gold catalyst comprises preparing a slurry of the metal oxide and adding an acidified solution of the gold compound to the slurry, preferably in a drop wise manner. The acidified solution of the gold compound comprises a gold compound or mixture of gold compounds and a solvent. The solvent may be water or an organic solvent capable of dissolving the gold compound. The concentration of gold in the solution affects the amount of gold adsorbed. Generally, increasing the concentration of gold in the solution results in increased gold adsorption. In an exemplary embodiment, the pH of the acidified solution of gold is less than or equal to about 4.5. In another exemplary embodiment, the pH of the acidified solution of gold is chosen such that the pH of the metal oxide slurry, after addition of the acidified gold solution, is less than or equal to the pH at zero charge of the metal oxide. Preferably, the pH of the metal oxide slurry after addition of the acidified gold solution is about 1 to about 2 pH units less than the pH at zero charge of the metal oxide.

The gold containing slurry is allowed to stir for a time sufficient to permit adsorption of the gold compound onto the metal oxide. The amount of time spent stirring is dependent upon, for example, the identity of the gold compound as well as the identity of the metal oxide. When the gold compound is $HAuCl_4$ and the metal oxide is alumina, for example, the amount of stir time may be about 1 hour and the alumina is observed to develop a yellowish color.

After adsorption, the metal oxide/gold complex is separated from a majority of the slurry liquid by a solid/liquid separation technique such as filtration, centrifugation, or simple decantation. The metal oxide/gold complex may then be washed with water, preferably deionized water. The metal oxide/gold complex is then contacted with a base to from a metal oxide/gold hydroxide complex and the pH of the resulting solution is monitored. Base is added until the solution pH reaches a constant level. The metal oxide/gold hydroxide complex is then separated from the solution and preferably washed with water. Preferably, the water is deionized. The metal oxide/gold hydroxide complex may then be dried in an oven or exposed to the ambient atmosphere to dry. Drying may be performed in addition to the calcining described below or drying and calcinations may be performed together.

The metal oxide/gold hydroxide complex is calcined at a sufficient temperature and sufficient time to fix the gold onto the support material such that the gold does not leach into wash water intended to remove chloride ion, and to partially reduce gold into a mixed valent state, including elemental gold and oxidized gold. Suitable calcination temperatures are less than or equal to about 600° C., preferably less than or equal to about 400° C. Additionally, calcination temperatures are greater than or equal to about 50° C., preferably greater than or equal to about 100° C., and more preferably greater than or equal to about 200° C. The calcination may be conducted for about 0.5 hours to about 6 hours, preferably about 1 hour to about 5 hours, and more preferably about 2 hours to about 4 hours. Calcination results in the formation of a gold catalyst. However, calcination may not be necessary when the metal oxide/gold hydroxide complex is located in reaction environments having temperatures greater than or equal to about 50° C. In these environments, the gold catalyst may be formed from the metal oxide/adsorbed gold complex in situ.

Preferably, in yet another method of making a gold catalyst, the method comprises preparing a gold solution by reacting a chloroauric acid (e.g., $HAuCl_4$) slowly with a solution of a strong base (e.g., sodium hydroxide) resulting in an intermediate gold complex (or mixture of complexes) that is then precipitated or deposited onto a support material (e.g., alumina), which may be either in the form of an aqueous or non-aqueous slurry or granules mixed with a solvent, followed by washing, calcination and, optionally, washing again. Preferably, the solvent is water. Preferably, the gold-alumina mixture is washed once after precipitation/deposition, then calcined at a temperature of about 100° C. to about 600° C., with a temperature of about 350° C. to about 450° C. preferred, and then washed again repeatedly to remove chloride from the catalyst. Optionally, the catalyst may be calcined again after essentially all of the chloride is washed away. Preferably, the calcination are performed under humid conditions in an oxidizing atmosphere.

For example, the gold solution may be obtained by reacting $HAuCl_4$, having a pH less than or equal to about 2, slowly with sodium hydroxide until the pH of the solution has a pH of about 6 to about 8, with a neutral pH of 7 preferred. A support material, e.g., alumina, may be added to the solution and heated at a temperature sufficient and for a sufficient duration for the gold to adsorb onto the support material, e.g., at a temperature of about 75° C. to 125° C. for about 1 hr. After adsorption, the metal oxide/gold precipitate may be separated from a majority of the solution liquid by a solid/liquid separation technique such as filtration, centrifugation, or simple decantation. The metal oxide/gold complex may then be washed with water, preferably deionized water to remove Cl⁻ and Na⁺ ions. Optionally, acetone may than be used to wash the precipitate. The precipitate is then dried and calcined at a sufficient temperature and sufficient time to fix the gold onto the support material. Suitable calcination temperatures are less than or equal to about 600° C., preferably less than or equal to about 400° C. Additionally, calcination temperatures are greater than or equal to about 50° C., preferably greater than or equal to about 100° C., and more preferably greater than or equal to about 200° C. The calcination may be conducted for about 0.5 hours to about 6 hours, preferably about 1 hour to about 5 hours, and more preferably about 2 hours to about 4 hours.

The gold catalyst may be prepared by any of the above methods to obtain a gold catalyst capable of being active for carbon monoxide oxidation at temperatures less than or equal to about 100° C. Preferably, the gold catalyst has a metal loading (e.g., gold loading) of greater than or equal to about 0.1 weight percent (wt %), preferably greater than or equal to about 0.5 wt %, and more preferably greater than or equal to about 0.75 wt %, based on the total weight of the catalyst and support material. The gold catalyst may have a metal loading of less than or equal to about 7 wt %, preferably less than or equal to about 5 wt %, and more preferably less than or equal to about 2.5 wt %, based on the total weight of the catalyst and support material.

The gold catalyst is active for carbon monoxide oxidation. However, gold catalysts may be very readily deactivated, i.e., poisoned, by hydrocarbons, e.g., n-decane. Since exposing the gold catalyst to hydrocarbons may deactivate it, the gold catalyst is preferably protected from hydrocarbons. As will be discussed in much greater detail, the gold catalyst may be protected by a second catalyst disposed in a physical mixture with the gold catalyst, a second catalyst disposed upstream of the gold catalyst in an exhaust system, or a second catalyst disposed both in physical mixture with the gold catalyst and disposed upstream of the gold catalyst in an exhaust system.

The second catalyst comprises an adsorbent material (e.g., β-zeolite), a support material, (e.g., theta alumina (θ-$Al_2O_3$)), and an oxidation catalyst (e.g., platinum), wherein the adsorbent material is capable of adsorbing hydrocarbons and the oxidation catalyst is active for the oxidation of hydrocarbons. However, it is noted that employing only an adsorbent material, e.g., β-zeolite, may not protect the gold catalyst.

The adsorbent material comprises a material capable of adsorbing or trapping hydrocarbons. For example, the adsorbent material may include, but is not limited to, zeolites that are capable of trapping hydrocarbons at low temperatures (i.e., less than or equal to about 250° C., with less than or equal to about 150° C. more preferred) and releasing those hydrocarbons at higher temperatures where they may oxidize more readily. In particular, the zeolite may be characterized in that it maintains crystalline structure over extended operation at temperatures in the range of 750° C. to about 850° C. in air, has an average pore size (taken along the major diameter (i.e., the longest diameter)) of greater than or equal to about 0.6 nanometers (nm), and a has a Si/Al ratio of preferably about 30 to about 100. Examples of suitable zeolites are beta zeolite, ultra-stable Y zeolite, and UTD-1 zeolite, with beta and Y being preferred. In an exemplary embodiment, more than one type of zeolite may be used. For example, a blend of beta and Y zeolites may be used, or two or more zeolites each having a different range of pore sizes may be used.

Additionally, the support material may comprise an inorganic oxide, which may improve adhesion of the zeolite to a carrier substrate in, for example, a washcoat process or act as a binder for catalysts formed without a carrier substrate. In addition, the inorganic oxide, (e.g., alumina and titania), may aid in the oxidation of carbon monoxide. Moreover, both alumina and titania may tend to also promote the oxidation of hydrocarbons. The alumina may be in the gamma, delta, or theta forms. The titania is preferably in the anatase phase.

The oxidation catalyst of the second catalyst is active for the oxidation of hydrocarbons. Preferably, oxidation catalyst of the second catalyst contains palladium or platinum. Additionally, it is noted that suitable oxidation catalyst precursor compounds include, but is not limited to, tetraamine platinum hydroxide, platinum nitrate, platinum sulfite, platinum dicarbonyl dichloride, dinitrodiamino platinum, palladium nitrate, diamminepalladium hydroxide, tetraamminepalladium chloride, palladium citrate, rhodium trichloride, hexaamminerhodium chloride, rhodium carbonylchloride, rhodium trichloride hydrate, rhodium nitrate, hexachloroiridate (IV) acid, hexachloroiridate (III) acid, dichlorodhydroiridate (III) acid, ammonium hexachloroiridate (III) acid, ammonium aquohexachloroiridate (IV), tetraammine-dichloroiridate (III) chloride, and tetraamminedichloroiridate (III) chloride.

The second catalyst comprising may be in a physical mixture with the gold catalyst. In other words, the second catalyst may be added to the slurry used in making the gold catalyst. In an exemplary embodiment, a ratio of the volume of catalyst metal used for the second catalyst, e.g., platinum, to the volume of gold catalyst used in the first catalyst is less than or equal to about 2, with a ratio of less than or equal to about 1 more preferred. In another exemplary embodiment, the ratio of the second metal catalyst volume to first metal catalyst volume is greater than or equal to about 1:12.5.

In other embodiments, the second catalyst may, additionally or alternatively, be disposed upstream of the gold catalyst. The term upstream as used herein has its ordinary meaning, and is used herein to generally denote the position of a component relative to the other component in a system, for example, an exhaust system. By having the second catalyst disposed upstream of the gold catalyst, hydrocarbons in the exhaust system may be trapped and oxidized, thereby substantially reducing/eliminating hydrocarbons in the exhaust stream. The gold catalyst may be used in the reduction of carbon monoxide that may be present in the exhaust fluid. Since the hydrocarbons are substantially reduced/eliminated, the gold catalyst may be protected from being deactivated. As such, the gold catalyst having a second catalyst disposed upstream, or disposed in a physical mixture therewith, or a combination comprising at least one of the foregoing, may have an extended life, i.e., a greater activity for a longer period of time, compared to a gold catalyst that is not protected from hydrocarbons.

Additionally, controlling the space velocity of exhaust fluid through the exhaust treatment device comprising the gold catalyst may further protect the gold catalyst. For example, at temperatures lower than about 100° C., the space velocity may be less than or equal to about 250,000 $hr^{-1}$, with a space velocity of less than or equal to about 37,000 hr$^{-1}$ preferred, and a space velocity of less than or equal to about 25,000 hr$^{-1}$ more preferred.

EXAMPLES

A precipitation/deposition approach was used to make the gold catalyst used herein. An exemplary procedure for making the gold catalyst is as follows:

To 22 ml of aqueous solution of HAuCl$_4$ containing 4.39 mg Au/ml (pH is 1.8), 2 milliliters (ml) of 0.95 Molar (M) NaOH solution was added at 23° C. by portions of 50 microliters (μl) to 200 (μl) until a pH value of 6.75 (a [OH]:[Au] molar ratio is 3.9)

The obtained solution was heated with 5 g of γ-Al$_2$O$_3$ (pre-calcined in a dry air flow at 750° C. for 4 hr; $S_{BET}$ is 200 m$^2$/g, pore volume is 1.15 ml/g, particle size 0.25 millimeters (mm) to 0.5 mm in a sealed, shaken, temperature controlled reactor at 70° C. for 2 hr. The solution was decanted and a precipitate was washed by vigorous agitation with some portions of distilled water (0.8 liter, 14 times) at 35° C. to remove chlorine ions (Cl$^-$) and sodium ions (Na$^+$) and then filtered using a Buchner funnel, washed with a small volume of acetone (5 ml to 10 ml) and dried at room temperature and 0.02 Torr for 12 hours. A dried sample was heated in air to 400° C. during 2 hours and then calcined at this temperature for another 4 hours. The content of gold in the sample prepared was 1.2% by weight, as measured by ICP.

The catalytic activity in CO oxidation was tested at space velocity SV=18,300 h$^{-1}$, which corresponds to the contact time τ=0.2 seconds (s). The linear velocity of gas flow was about 0.06 meters per second (m/s). Initially, the gold catalyst diluted with quartz particles of about 1 millimeter (mm) to about 2 mm in size was loaded into the reactor. A second catalyst (as described above, and in, for example, U.S. Pat. No. 6,127,300 to Kharas et al. and U.S. Pat. No. 5,897,846 to Kharas et al., which are herein incorporated in their entirety.) granular bed was situated upstream of the gold catalyst bed. The gold and the second catalyst beds were divided by means of a pure quartz bed.

The initial reaction mixture for testing had the following composition: 0.1% carbon monoxide (CO), 10% water (H$_2$O), 14% oxygen (O$_2$), 0.075% n-decane (n-C$_{10}$H$_{22}$), and nitrogen as a balance gas. Temperature was linearly varied from 30° C. to 300° C. with the heating rate of 10° C./min controlled by a personal computer. Three sequential heating-cooling cycles (runs) were carried out during a single testing procedure.

The thermal aging procedure was performed at 700° C. for 4 hours; the flowing gas mixture (a feeding blend) had the following composition: 10% water vapor, air as a balance gas. After the thermal aging procedure, three subsequent cycles of the catalytic activity measurements were repeated.

Figure 2:
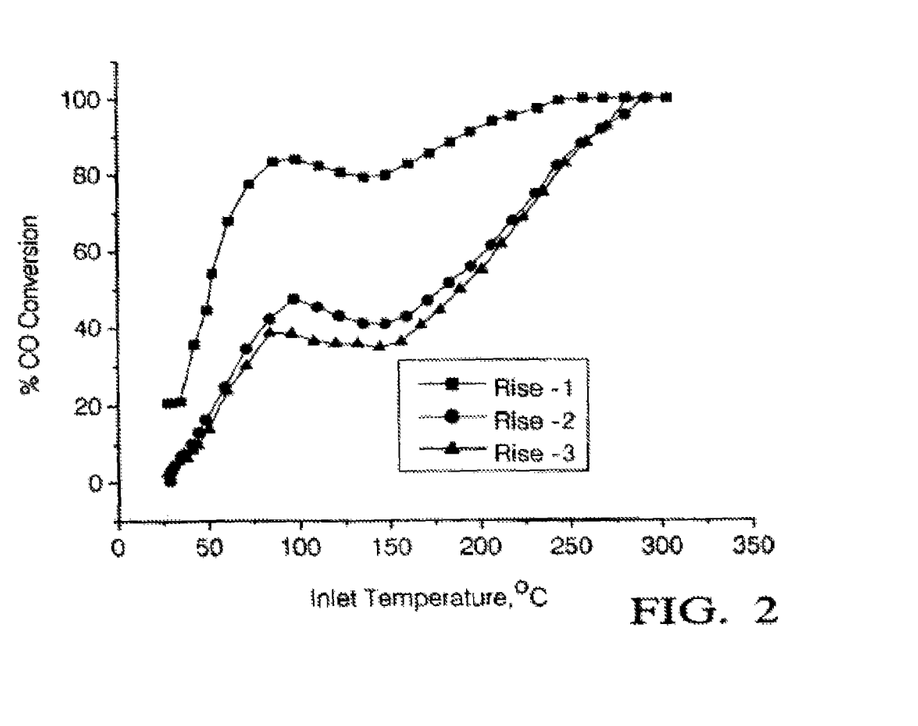
FIG. 2 is a graph of performance data of a gold catalyst tested with n-decane in the fluid stream.

The gold catalyst was tested fresh, three times, using the above described synthetic gas mixture, which includes n-decane. As is shown in FIG. 2, performance is substantially poorer in the second temperature rise and even slightly worse in the third temperature rise. In other words, the percent conversion of carbon monoxide was lower at the second temperature rise and the third temperature rise compared to the first temperature rise.

Figure 3:
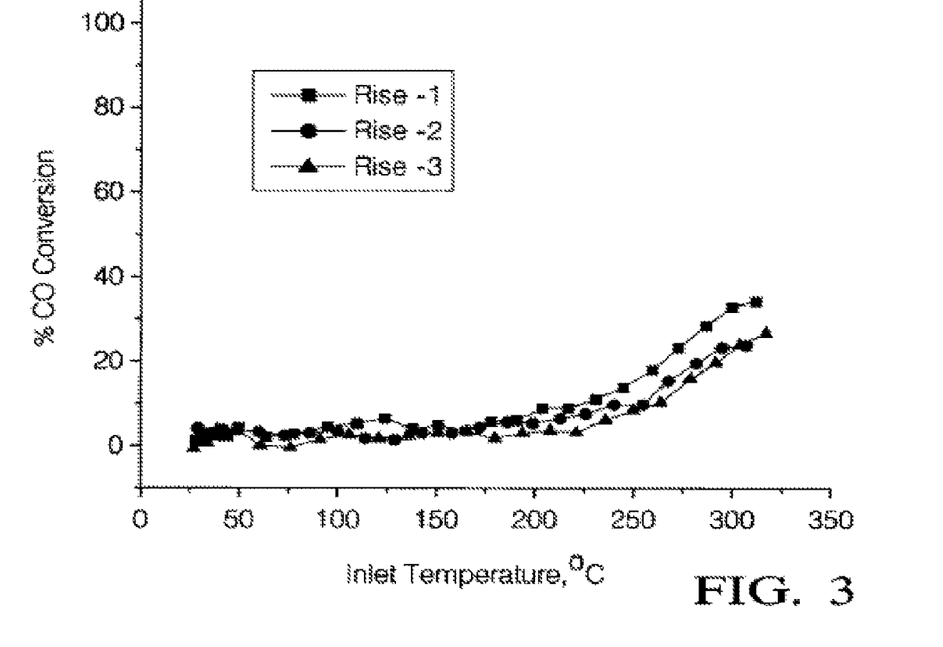
FIG. 3 is a graph of performance data of a gold catalyst after thermal aging tested with n-decane in the fluid stream.

After thermal aging, the catalyst sample initially tested in the presence of n-decane was essentially inactive, as shown in FIG. 3.

Figure 4:
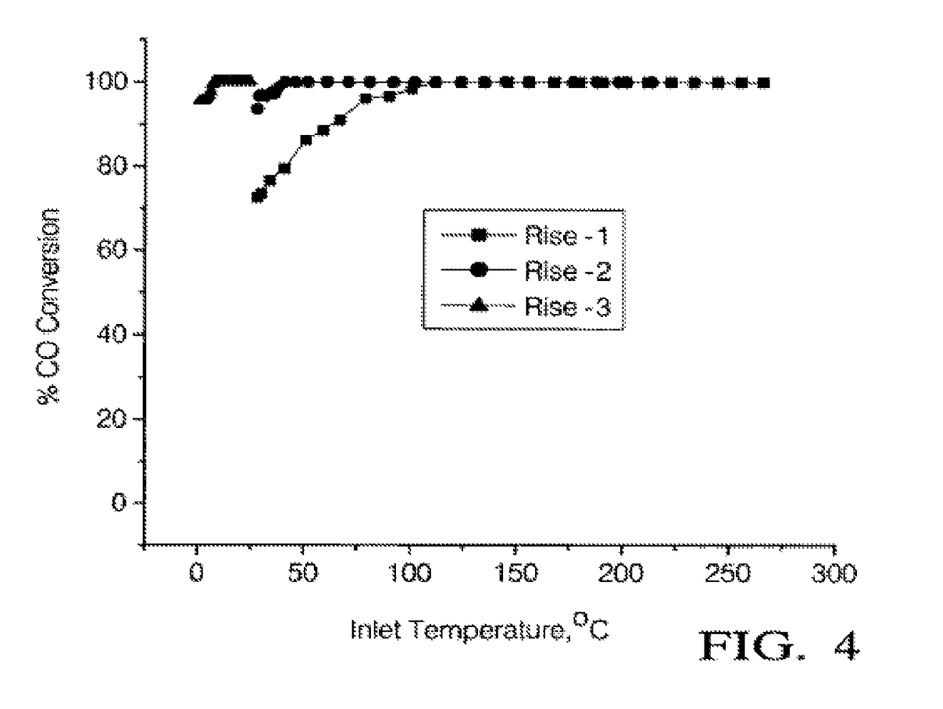
FIG. 4 is a graph of performance data of a gold catalyst tested without n-decane in the fluid stream.

When the same catalyst is tested fresh without n-decane, performance improved with testing time. As shown in FIG. 4, the first temperature rise is the worst, and the subsequent two temperature rises show light-off temperatures well below room temperature.

Figure 5:
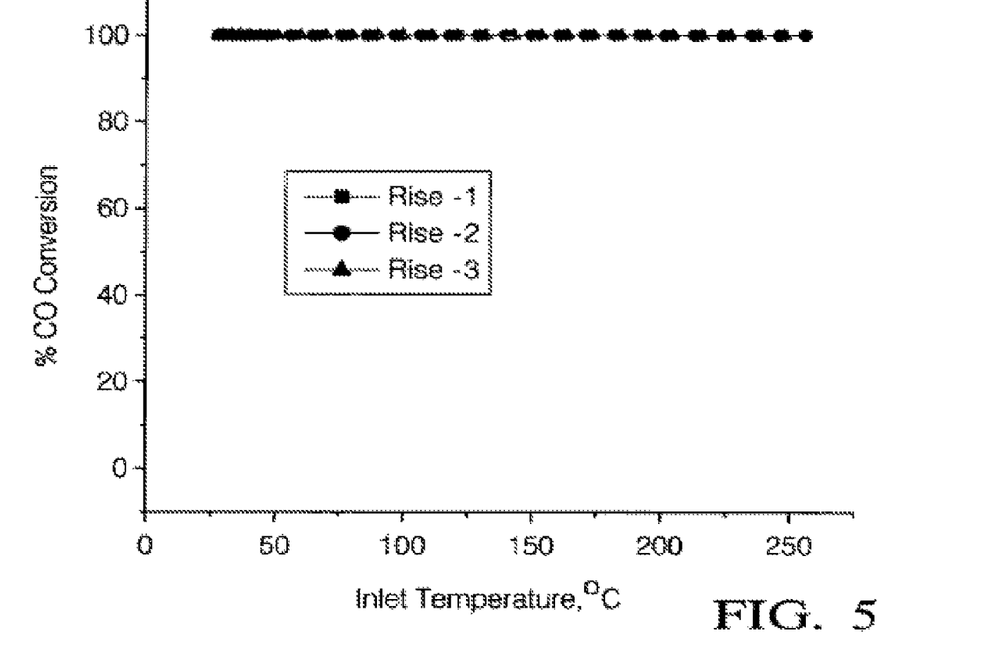
FIG. 5 is a graph of performance data of a gold catalyst after thermal aging tested without n-decane in the fluid stream.

When the gold catalyst, initially tested in the absence of n-decane, was then subjected to thermal aging and tested again, it was even more active compared to a sample that had not been subjected to thermal aging. As shown in FIG. 5, conversion was always 100%, and apparently light off temperature had moved to temperatures even further below room temperature.

Figure 6:
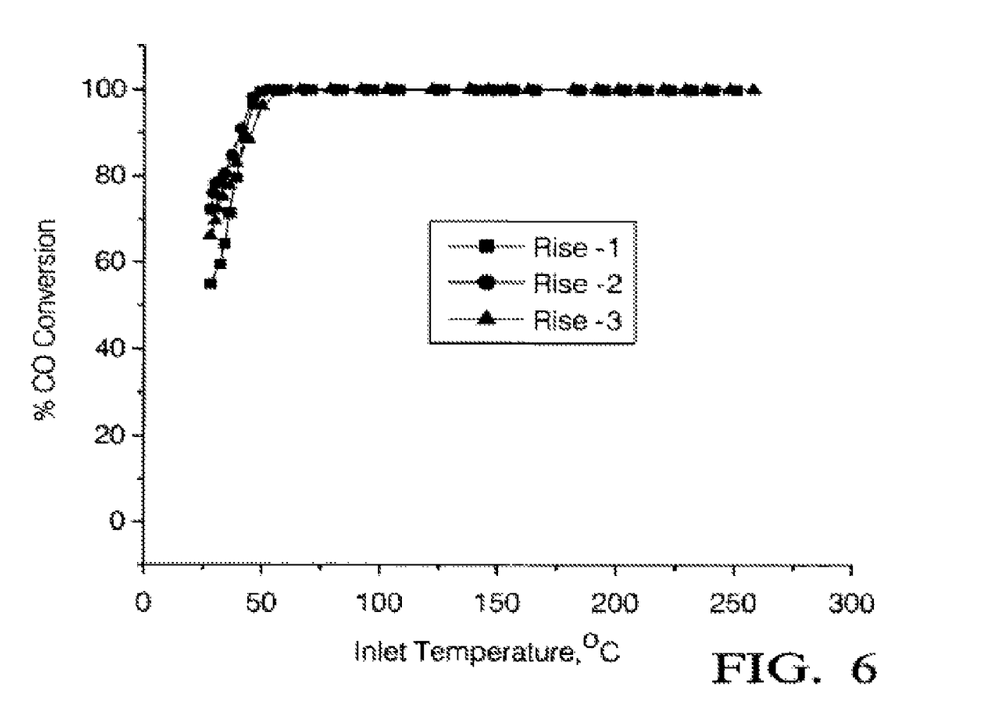
FIG. 6 is a graph of performance data of a gold catalyst when a second catalyst comprising an oxidation component capable of oxidizing hydrocarbons and an adsorbent component capable of adsorbing hydrocarbons is employed upstream (upstream bed volume 300 micro-liters) of the gold catalyst (gold catalyst bed volume 700 micro-liters) and n-decane is in the fluid stream.

FIG. 6 shows the results of a 300 micro-liter second catalyst granular bed of a second catalyst (Pt-zeolite-alumina diesel oxidation catalyst) was situated upstream of a 700 micro-liter bed of the gold catalyst. This dual bed system was then tested with the fully formulated model gas blend, including n-decane. As is illustrated in FIG. 6, low-temperature CO oxidation activity was observed, i.e., CO oxidation activity was observed at temperatures below 100° C. Additionally, the first temperature rise had the worst, not the best, performance. The CO oxidation activity shown in FIG. 6 is a little worse than that of FIG. 4, but much better than FIG. 2. The slightly inferior low temperature CO oxidation results of FIG. 5, compared to FIG. 3, may be attributed to the fact that the gold bed is small than in FIG. 4. The total bed volume was held constant, as such the gold bed was 30% smaller in FIG. 6 than in FIG. 4.

Figure 7:
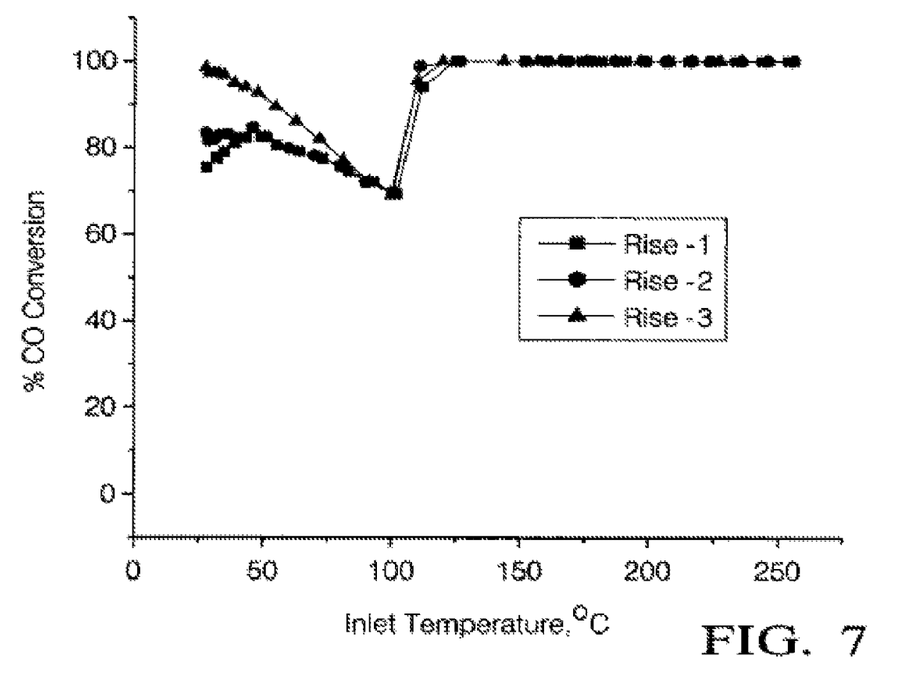
FIG. 7 is a graph of performance data of a gold catalyst after thermal aging when a second catalyst comprising an oxidation component capable of oxidizing hydrocarbons and an adsorbent component capable of adsorbing hydrocarbons is employed upstream (upstream bed volume 300 micro-liters) of the gold catalyst (gold catalyst bed volume 700 micro-liters) and n-decane is in the fluid stream.

FIG. 7 shows the results, after thermal aging, of a test 300 micro-liter second catalyst granular bed of a second catalyst (Pt-zeolite-alumina diesel oxidation catalyst) was situated upstream of a 700 micro-liter bed of the gold catalyst. In comparing FIG. 7 to FIG. 3, it appears that the use of the second catalyst protects the low-temperature CO oxidation function of the gold catalyst from hydrocarbon-associated deactivation, because under similar conditions the gold alone was essentially deactivated as illustrated in FIG. 3.

Figure 8:
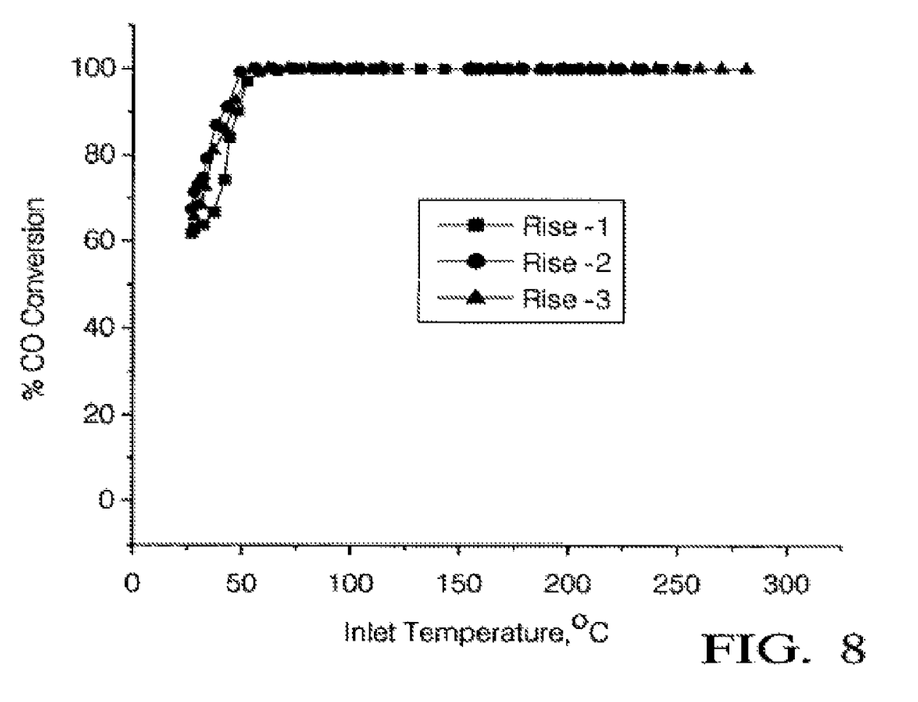
FIG. 8 is a graph of performance data of another test of a gold catalyst when a second catalyst comprising an oxidation component capable of oxidizing hydrocarbons and an adsorbent component capable of adsorbing hydrocarbons is employed upstream (upstream bed volume 500 micro-liters) of the gold catalyst (gold catalyst bed-volume 500 micro-liters) and n-decane is in the fluid stream.

In another experiment, 500 micro-liter of the second catalyst guard bed was employed upstream of 500 micro-liter of the gold catalyst. As was the case in the first experiment, the first rise of the fresh composite catalyst was the worst. As shown in FIG. 8, this mixed catalyst is also active near at low temperatures, i.e. temperatures below 100° C.

Figure 9:
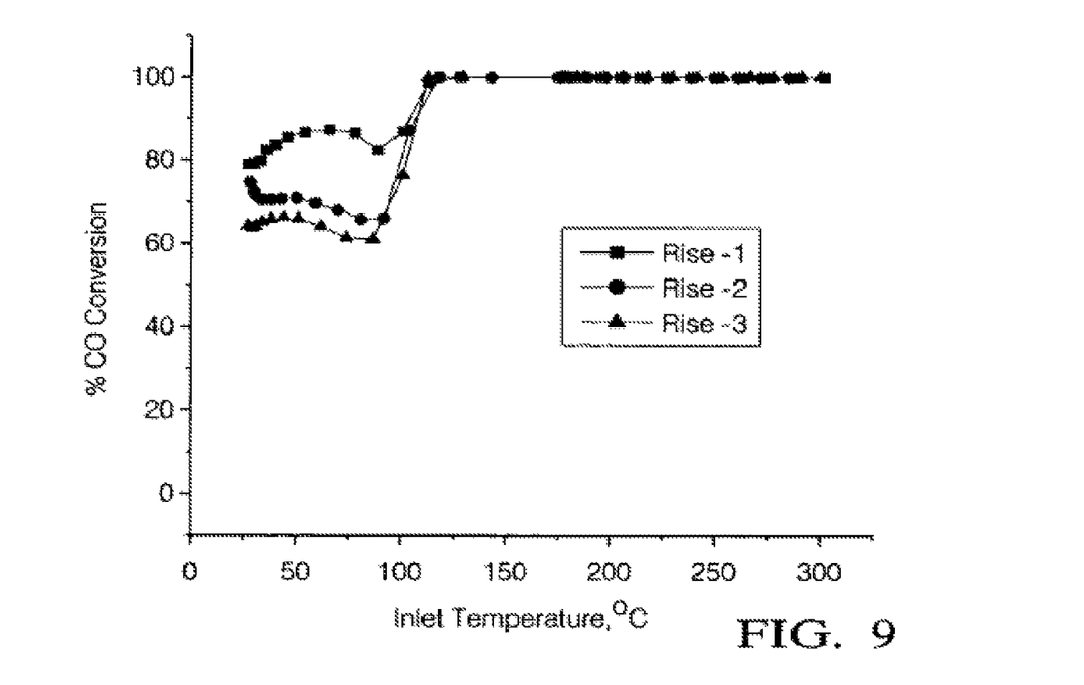
FIG. 9 is a graph of performance data of yet another test of a gold catalyst after thermal aging when a second catalyst comprising an oxidation component capable of oxidizing hydrocarbons and an adsorbent component capable of adsorbing hydrocarbons is employed upstream (upstream bed volume 500 micro-liters) of the gold catalyst (gold catalyst bed volume 500 micro-liters) and n-decane is in the fluid stream.

After thermal aging, this catalyst began to show signs of decane-induced deactivation, as shown in FIG. 9. Specifically, after thermal aging, Rise-1 shows the highest conversions. Conversion levels drop for Rise-2 and drop a little more for Rise-3. The space velocity through the gold bed was about 37000 hr$^{-1}$ in this particular experiment.

Figure 10:
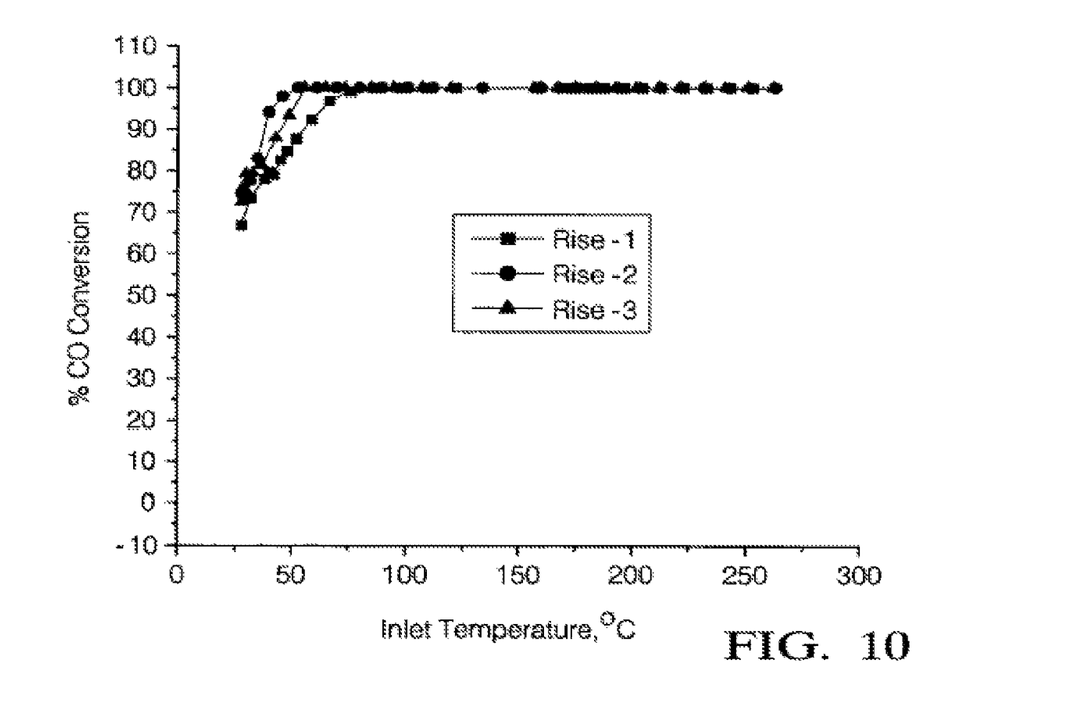
FIG. 10 is a graph of performance data of a gold catalyst when a second catalyst comprising an oxidation component capable of oxidizing hydrocarbons and an adsorbent component capable of adsorbing hydrocarbons is in a physical mixture with gold catalyst and n-decane is in the fluid stream.
Figure 11:
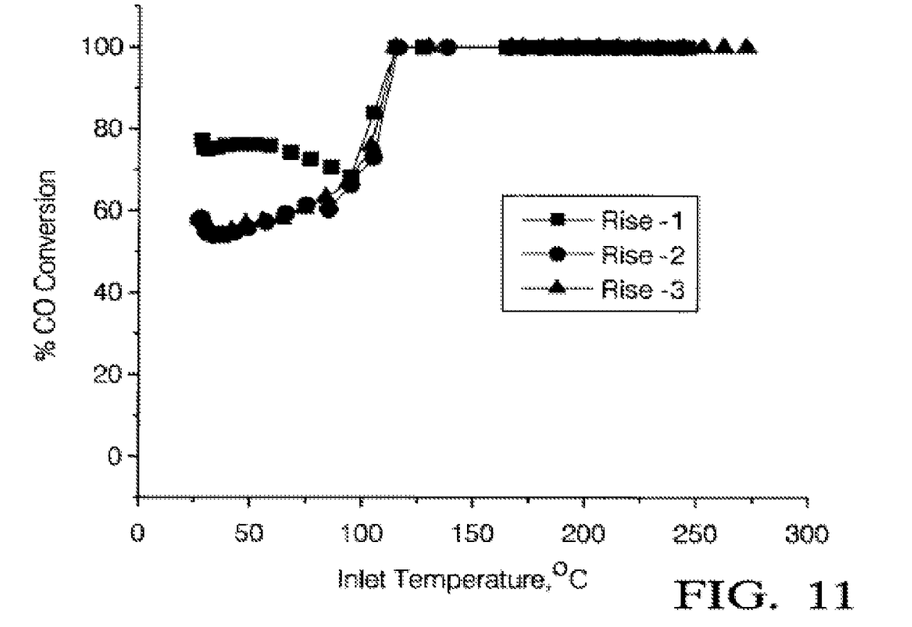
FIG. 11 is a graph of performance data of a gold catalyst when a second catalyst comprising an oxidation component capable of oxidizing hydrocarbons and an adsorbent component capable of adsorbing hydrocarbons is in a physical mixture with gold catalyst after thermal aging and n-decane is in the fluid stream.

Additional experiments were conducted to determine if the benefits of protecting the gold catalyst against hydrocarbon-induced deactivation might be obtained when physical mixtures of the second catalyst and the gold catalyst are employed. The conclusion was that the benefits were obtained by having the second catalyst in a physical mixture with the gold catalyst. These results are illustrated in FIGS. 10-11.

Figure 12:
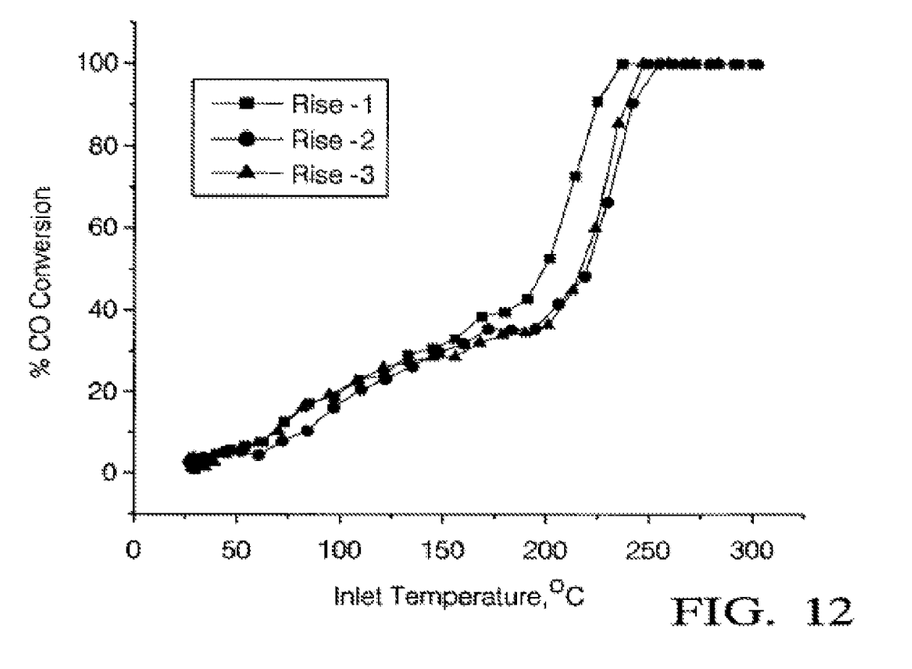
FIG. 12 is a graph of performance data of gold catalyst when only a hydrocarbon adsorbent component is employed upstream of the gold catalyst.

When the second catalyst contained only calcined beta zeolite, rather than containing Pt/(θ-Al$_2$O$_3$+β-zeolite), as a guard bed, the results obtain were even worse than in the absence of the guard bed. Compare FIG. 12 to FIG. 2. Without being bound by theory, this observation may be attributed to the fact that the zeolite may have cracked decane to unsaturated species that very effectively poisoned the gold catalyst.

In various embodiments, an exhaust treatment system comprising a gold catalyst and a second catalyst in a physical mixture with the gold catalyst or located upstream of the gold catalyst has a carbon monoxide conversion greater than or equal to about 45% at temperatures of about 25° C. to about 100° C. after thermal aging (i.e., the gold catalyst and the second catalyst are exposed to temperatures of up to about 800° C. for a period of time up to about 4 hours). More particularly, at temperatures of about 50° C. to about 75° C., a CO conversion is greater than or equal to 50%, with greater than or equal to 70% preferred. Additionally, at temperatures greater than about or equal to about 125° C., the exhaust treatment system has a carbon monoxide conversion system greater than or equal to about 90% conversion, with 100% conversion preferred.

Advantageously, embodiments disclosed herein allow for carbon monoxide oxidation at temperatures below 100° C. by employing a second catalyst to protect the gold catalyst from hydrocarbon deactivation. As such, a reduction in carbon monoxide emissions may be realized, since greater than 50% of the allowed carbon monoxide emissions may occur during start-up conditions, i.e., temperatures below 100° C. For example, greater than or equal to 50% CO may be converter to $CO_2$ at temperatures less than or equal to about 100° C. in an atmosphere comprising a hydrocarbon at a space velocity less than or equal to 50,000 $hr^{-1}$.

Additionally, it is noted that the disclosed gold catalyst with second protection catalyst may be used in any application where carbon monoxide oxidation at temperatures less than or equal to about 100° C. is desirable. For example, the catalyst system comprising the gold catalyst and second protection cold catalyst may be used in the automotive industry for exhaust gas treatment; and in home use, such as in a purification system for treatment of household air, which may be incorporated as part of a home heating system.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of using a catalyst system comprising:
   passing an exhaust stream over a catalyst system comprising
      a gold catalyst having a gold particle size less than or equal to 10 nm supported on a first support which is a metal oxide; and
      a hydrocarbon oxidation catalyst comprising a hydrocarbon adsorbing material, and an oxidation catalyst being platinum or palladium supported on a second support comprising an inorganic oxide,
      wherein the first and second supports are separate and the gold catalyst and the hydrocarbon oxidation catalyst are in a physical mixture;
   and oxidizing at least a portion of CO present in the exhaust stream.

2. The method of claim 1, wherein greater than or equal to 50% CO in the exhaust stream is converted to $CO_2$ at a space velocity less than or equal to 250,000 $hr^{-1}$ at a temperature less than or equal to about 100° C.

3. A method of treating one or more exhaust streams comprising carbon monoxide, one or more hydrocarbons, and one or more nitrogen oxides, comprising:
   passing the one or more exhaust streams over a combination of catalytic components comprising
      a gold catalyst having a gold particle size less than or equal to 10 nm supported on a first support which is a metal oxide; and
      a hydrocarbon oxidation catalyst comprising a hydrocarbon adsorbing material, and an oxidation catalyst being platinum or palladium supported on a second support comprising an inorganic oxide,
      wherein the first and second supports are separate and the gold catalyst and the hydrocarbon oxidation catalyst are in a physical mixture;
   and oxidizing at least a portion of the carbon monoxide in the one or more exhaust streams.

4. The method of claim 3, wherein greater than or equal to 50% CO in the exhaust stream is converted to $CO_2$ at a space velocity less than or equal to 250,000 $hr^{-1}$ at a temperature less than or equal to about 100° C.

5. A method of protecting a gold catalyst, having a gold particle size less than or equal to 10 nm which is supported on a first support which is a metal oxide, from deactivation by a hydrocarbon in an exhaust gas which comprises
   adsorbing and oxidizing the hydrocarbon in the exhaust gas with a hydrocarbon oxidation catalyst comprising a hydrocarbon adsorbing material, and an oxidation catalyst being platinum or palladium which is supported on a second support comprising an inorganic oxide,
   wherein the first and second supports are separate and the gold catalyst and the hydrocarbon oxidation catalyst are in a physical mixture.

6. The method of claim 5, wherein the temperature of the exhaust gas is equal to or greater than about 125° C.

7. The method of claim 5, wherein the temperature of the exhaust gas ranges from about 25° C. to about 300° C.

8. The method of claim 1, wherein the second support comprises an alumina selected from the group consisting of the gamma alumina, delta alumina, and theta alumina.

9. The method of claim 1, wherein a ratio of a gold catalyst volume to a hydrocarbon oxidation catalyst volume is greater than or equal to about 1:12.5.

10. The method of claim 3, wherein the second support comprises an alumina selected from the group consisting of the gamma alumina, delta alumina, and theta alumina.

11. The method of claim 3, wherein a ratio of a gold catalyst volume to a hydrocarbon oxidation catalyst volume is greater than or equal to about 1:12.5.

12. The method of claim 5, wherein the second support comprises an alumina selected from the group consisting of the gamma alumina, delta alumina, and theta alumina.

13. The method claim 5, wherein a ratio of a gold catalyst volume to a hydrocarbon oxidation catalyst volume is greater than or equal to about 1:12.5.

14. The method of claim 1, wherein the hydrocarbon adsorbing material is a zeolite selected from the group consisting of beta zeolite, ultra-stable Y zeolite and UTD-1 zeolite.

15. The method of claim 3, wherein the hydrocarbon adsorbing material is a zeolite selected from the group consisting of beta zeolite, ultra-stable Y zeolite and UTD-1 zeolite.

16. The method of claim 5, wherein the hydrocarbon adsorbing material is a zeolite selected from the group consisting of beta zeolite, ultra-stable Y zeolite and UTD-1 zeolite.

* * * * *